(12) United States Patent
Dalhamer

(10) Patent No.: US 7,267,244 B1
(45) Date of Patent: Sep. 11, 2007

(54) PEGBOARD TRAY FOR RETAINING FOOD ITEMS DURING TRANSPORTATION

(76) Inventor: Coni Dalhamer, 3581 Sequoia Dr., Beavercreek, OH (US) 45431

( * ) Notice: Subject to any disclaimer, the term of this patent is extended or adjusted under 35 U.S.C. 154(b) by 545 days.

(21) Appl. No.: 10/739,805

(22) Filed: Dec. 18, 2003

(51) Int. Cl.
B65D 6/04 (2006.01)

(52) U.S. Cl. ............................................. 220/574

(58) Field of Classification Search ............ None
See application file for complete search history.

(56) References Cited

U.S. PATENT DOCUMENTS

| | | | |
|---|---|---|---|
| 3,508,183 A | 4/1970 | Pinkard | |
| 3,610,459 A | 10/1971 | Hansen | |
| 4,239,230 A | 12/1980 | Shoptaugh | |
| 4,802,593 A * | 2/1989 | Romanos | 211/10 |
| 4,908,066 A | 3/1990 | Taylor et al. | |
| 5,055,081 A | 10/1991 | Nayak | |
| 5,097,957 A * | 3/1992 | Adams et al. | 206/557 |
| 5,269,447 A | 12/1993 | Gower et al. | |
| 5,586,800 A | 12/1996 | Triplett | |
| 5,762,245 A | 6/1998 | Hurst | |
| 5,878,672 A * | 3/1999 | Ostermann et al. | 108/44 |
| 5,915,561 A | 6/1999 | Lorenzana et al. | |
| 5,975,628 A | 11/1999 | Russell | |
| 6,179,377 B1 | 1/2001 | Harper | |
| 6,315,126 B1 | 11/2001 | Cornelissen | |
| 2004/0144683 A1* | 7/2004 | Wang | 206/557 |

* cited by examiner

Primary Examiner—Stephen Castellano
(74) Attorney, Agent, or Firm—R. William Graham

(57) ABSTRACT

A pegboard tray for retaining food items during transportation includes a base support surface on which a food container of a predetermined height can be disposed and retained in a manner to prevent lateral movement, the base support surface having a plurality of peg receiving surfaces and a plurality of pegs, wherein each peg is removably disposed one the peg receiving surface about the food container and wherein pegs cooperate with each other in a manner to prevent the food container from moving laterally on the base support surface.

6 Claims, 1 Drawing Sheet

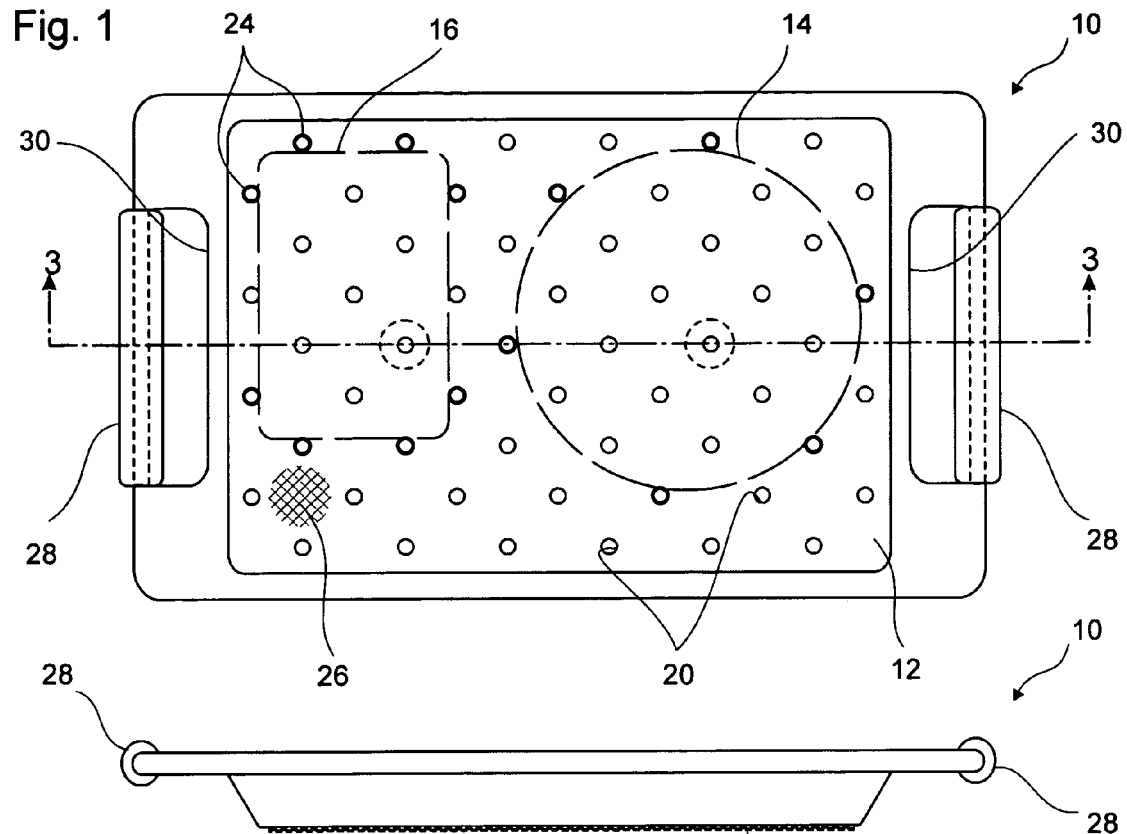
Fig. 1
Fig. 2
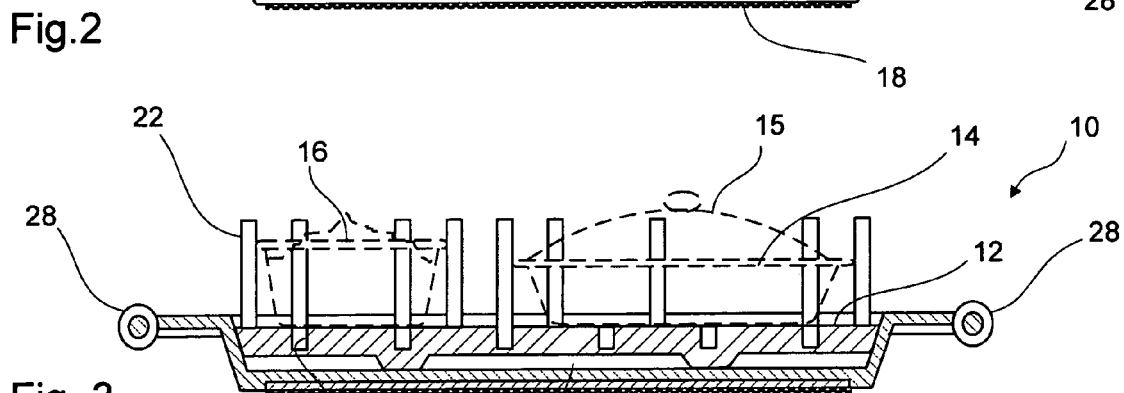
Fig. 3
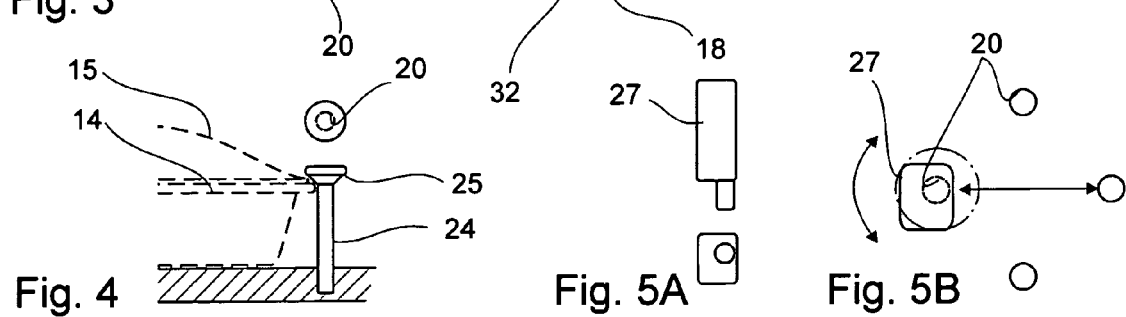
Fig. 4   Fig. 5A   Fig. 5B

PEGBOARD TRAY FOR RETAINING FOOD ITEMS DURING TRANSPORTATION

BACKGROUND OF THE INVENTION

1. Field of the Invention

The present invention relates to trays for food. More particularly, the invention relates to a pegboard tray for retaining food items during transportation.

2. Related Art

Food trays are commonly used at social functions where food is served, such as parties and receptions. At gatherings where family and friends are asked to bring a dish of food, these dishes vary in content of solids and liquids. In either case, the transportation of such foods in a vehicle to and from the gathering can be difficult. Dishes are commonly placed in the floor board of the vehicle and have a tendency to slide around during transport resulting many times in spilling of the contents into the vehicle. Attempts to prevent this from occurring include surrounding the food container with towels or other items to prevent the food container from sliding around on the floor board. This has not proven to be an acceptable solution. Still, others have created cargo retainers in the rear of vehicles, such as the trunk, which retain cargo within a predefined space within the retainer. Likewise, this has not proven to be an acceptable solution as the food container size varies in configuration which in many instances is not suitably fixed against movement within the cargo retainer's predefined retainer space. Moreover, many of the food items/containers are hot. Consequently, transporting these to and from the automobile requires handling with hot pads and/or mittens.

Some food trays of the prior art incorporate a flat surface portion and a cup-like portion formed in the upper surface of the plate for supporting both food and a drink container. Although the plates of this type are capable of supporting a drink container and some type of food container, they are not designed for transportation of various configured containers in a suitable manner to prevent spillage from occurring as a result of lateral G-forces acting on the transported food container.

There remains a need to aid one in transporting food items within a container from one's kitchen to a vehicle. Further, there is a need for a suitable transportation device for food containers which can be readily inserted and removed from one's vehicle. There is a further need that such a device be aesthetically pleasing. The present invention aims to solve these needs.

SUMMARY OF THE INVENTION

Therefore, it is an object of the present invention to provide a transportable food tray that overcomes the deficiencies present in the prior art.

It is another object of the invention to provide a transportable food tray capable of transporting a food container in a manner which prevents lateral movement thereof when disposed on the tray.

It is still another object of the invention to provide a transportable food tray that can be easily and comfortably transported by an individual with a food container disposed thereon to and from a vehicle.

It is yet another object of the invention to provide a transportable food tray which is aesthetically pleasing.

A method of transporting food is also provided.

Other objects and advantages will be readily apparent to those skilled in the art upon viewing the drawings and reading the detailed description hereafter.

Accordingly, the present invention

BRIEF DESCRIPTION OF THE DRAWINGS

FIG. 1 is a plan top view of a tray the present invention.

FIG. 2 is a side view of the present invention.

FIG. 3 is a cross-sectional view of the present invention through line 3-3.

FIG. 4 illustrates a part cross-sectional view of the present invention employing another peg form.

FIG. 5A is a side view of one type of peg and associated hole for use therewith in the tray of the present invention.

FIG. 5B is a top view of the peg of FIG. 5A.

DETAILED DESCRIPTION OF THE INVENTION

The present invention is directed to a pegboard tray for retaining food items during transportation which is generally designated by the numeral 10. The tray 10 has a base support surface 12 on which food containers 14 and 16, for example, can be disposed and retained against lateral movement. The base support surface 12 can include an anti-slip surface 18 which can be made of a rubber material, for example, and adhered to or otherwise formed to a bottom of the base support surface 12.

The base support surface 12 includes a plurality of peg receiving surfaces 20 to receive pegs 22. The peg receiving surfaces 20 are of a size to enable an end of the pegs 22 to be friction fit therein and thus once inserted will stay until manually removed. The peg receiving surfaces 20 are spatially positioned on in the base support surface 12 to accommodate various shaped food containers to be operatively disposed thereon and retained by pegs 22. The peg receiving surfaces 20 are oriented in at least three (ten shown in FIG. 4) equally spaced diagonal rows and wherein the rows substantially span the support surface 12 to provide the peg receiving surfaces 20 adjacent and about the food containers 14 and 16.

In FIG. 3, the pegs 22 are cylindrical by way of example. The pegs 22 are of a sufficient height such that when inserted into peg receiving surfaces 20 about food container 14, for example, they retain the container 14 in a manner to prevent lateral movement thereof with respect to the base support surface 12. In other words, the containers 14 and 16 do not tend slide or tip on the surface 12. Further, the pegs 22 can be of a sufficient height to extend to at least meet an associated lid 15 of the container 14. Similarly, the pegs 22 prevent the lid 15 from sliding or coming ajar from the container 14 during transport. Containers and lids made of glass, ceramic, Pyrex® or other cookware material are often inherently made of slippery surfaces and when transported, particularly via a vehicle, will tend to slide or tip when undergoing lateral G-forces.

Alternatively, as seen in FIGS. 1 and 4, the pegs 24 can be fluted in the shape of a golf tee for example. In this way, the pegs 24 may be easier to insert and remove with the aid of flared end 25. Another function of the flared end 25 can be to extend over an edge of the lid 15 to further aid in preventing the lid 15 from coming ajar as might be the case when transporting in a vehicle and going over a bump. Otherwise, the pegs 24 function in a similar manner to prevent lateral movement of the containers 14 and 16.

FIGS. 5A and 5B show yet another peg 27 which shape is generally rectangular in an upper portion to aid in retention of the containers 14 and 16 and having a generally cylindrical lower portion to friction fit to the peg receiving surfaces 20. The rectangular upper portion affords additional adjustment of odd sized dishes.

The tray 10 can further include an anti-slip material 26 formed on an upper part of the support surface 12 to aid in preventing sliding of the containers 14 and 16 and can be recessed. The tray 10 can further include a pair of handles 28 which are formed adjacent open surfaces 30 formed in the sides of the tray 10. The handles 10 are exemplary only and not intended for limiting the scope of the invention. Further, an air pocket 32 can be formed in the base support surface 12 to add an insulation feature.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A pegboard tray for retaining food items during transportation, which includes:
   a base support surface on which a food container of a predetermined height can be disposed and retained in a manner to prevent lateral movement, said base support surface having a plurality of peg receiving surfaces wherein said peg receiving surfaces are oriented in at least three equally spaced diagonal rows and wherein said rows substantially span said support surface to provide said peg receiving surfaces adjacent and about the food container; and
   a plurality of pegs, wherein each peg is removably disposed one said peg receiving surface about the food container and wherein said pegs cooperate with each other in a manner to prevent the food container from moving laterally on said base support surface, and wherein said pegs each have an upper portion and a lower portion, said lower portion being friction fit into said peg receiving surfaces and said upper portion being configured with an enlarged cross section and to extend over said container to retain against a top side of the food container.

2. The pegboard tray for retaining food items during transportation of claim 1, wherein said base support surface includes an anti-slip surface.

3. The pegboard tray for retaining food items during transportation of claim 1, wherein said anti-slip surface is on a bottom surface of said base support surface.

4. The pegboard tray for retaining food items during transportation of claim 1, wherein said anti-slip surface is on an upper surface of said base support surface.

5. The pegboard tray for retaining food items during transportation of claim 1, wherein said base support member includes an insulating portion.

6. The pegboard tray for retaining food items during transportation of claim 1, wherein said tray includes a handle on a side of said tray.

* * * * *